United States Patent
Sharma

(10) Patent No.: US 10,678,265 B2
(45) Date of Patent: Jun. 9, 2020

(54) REVISED SPEED ADVISORY FOR AN AIRCRAFT DURING FLIGHT BASED ON HOLDING TIME

(71) Applicant: Airbus SAS, Blagnac (FR)

(72) Inventor: Anurag Sharma, Bangalore (IN)

(73) Assignee: AIRBUS SAS, Blagnac (FR)

( * ) Notice: Subject to any disclaimer, the term of this patent is extended or adjusted under 35 U.S.C. 154(b) by 249 days.

(21) Appl. No.: 15/788,595

(22) Filed: Oct. 19, 2017

(65) Prior Publication Data

US 2018/0107227 A1    Apr. 19, 2018

(30) Foreign Application Priority Data

Oct. 19, 2016 (IN) .............................. 201641035786
Oct. 19, 2016 (IN) .............................. 201641035792

(51) Int. Cl.
| | |
|---|---|
| *G01C 23/00* | (2006.01) |
| *G05D 1/06* | (2006.01) |
| *G01C 21/20* | (2006.01) |
| *B64D 45/04* | (2006.01) |
| *G08G 5/00* | (2006.01) |

(Continued)

(52) U.S. Cl.
CPC ........... *G05D 1/0676* (2013.01); *B64D 31/06* (2013.01); *B64D 45/04* (2013.01); *G01C 21/20* (2013.01); *G08G 5/0013* (2013.01); *G08G 5/0026* (2013.01); *G08G 5/0039* (2013.01); *G08G 5/0043* (2013.01); *G08G 5/0082* (2013.01); *G08G 5/0091* (2013.01); *G08G 5/025* (2013.01)

(58) Field of Classification Search
CPC ...... G05D 1/0676; B64D 31/06; B64D 45/04; G08G 5/025; G08G 5/0013; G08G 5/0082; G08G 5/0043; G08G 5/0039; G08G 5/0026; G08G 5/0091; G01C 21/20
USPC ........................................ 701/3, 16, 18, 120
See application file for complete search history.

(56) References Cited

U.S. PATENT DOCUMENTS

| | | | | |
|---|---|---|---|---|
| 4,825,374 A | * | 4/1989 | King ................... | G01C 23/005 244/186 |
| 5,121,325 A | | 6/1992 | DeJonge | |

(Continued)

FOREIGN PATENT DOCUMENTS

| | | |
|---|---|---|
| EP | 2 071 542 | 6/2009 |
| GB | 2479167 | 10/2011 |

OTHER PUBLICATIONS

Combined Search and Examination Report cited in GB 1622074.1, dated Jun. 15, 2017, 11 pages.

(Continued)

*Primary Examiner* — Shardul D Patel
(74) *Attorney, Agent, or Firm* — Nixon & Vanderhye P.C.

(57) ABSTRACT

A method including obtaining real-time data, wherein the real-time data is at least one of data associated with aircrafts in and around an airport, real-time weather information, and runway unavailability at the airport. The real-time data is analyzed. A holding time associated with an aircraft that is approaching the airport for landing is measured based on the analysis of the real-time data. A revised speed advisory is determined for the aircraft based on the holding time. The revised speed advisory is sent to a flight navigation and performance computer and/or a flight management system on-board the aircraft, wherein a speed of the aircraft is controlled based on the revised speed advisory.

24 Claims, 7 Drawing Sheets

(51) Int. Cl.
*G08G 5/02* (2006.01)
*B64D 31/06* (2006.01)

(56) References Cited

U.S. PATENT DOCUMENTS

| | | | | |
|---|---|---|---|---|
| 6,049,754 | A * | 4/2000 | Beaton | G01C 21/00 |
| | | | | 340/990 |
| 9,076,327 | B1 * | 7/2015 | Baiada | G08G 5/0091 |
| 2003/0050746 | A1 * | 3/2003 | Baiada | G08G 5/0043 |
| | | | | 701/3 |
| 2007/0061055 | A1 * | 3/2007 | Stone | G01S 13/913 |
| | | | | 701/2 |
| 2009/0157288 | A1 * | 6/2009 | Bailey | G08G 5/0039 |
| | | | | 701/121 |
| 2011/0130948 | A1 * | 6/2011 | Oh | G08G 5/003 |
| | | | | 701/120 |
| 2012/0083997 | A1 * | 4/2012 | Meador | G08G 5/0013 |
| | | | | 701/120 |
| 2013/0197791 | A1 * | 8/2013 | Struzik | G06Q 50/30 |
| | | | | 701/123 |
| 2014/0129058 | A1 * | 5/2014 | Elahi | G08G 5/0021 |
| | | | | 701/16 |
| 2016/0229554 | A1 * | 8/2016 | Kawalkar | G01C 23/005 |

OTHER PUBLICATIONS

Combined Search and Examination Report cited in GB 1622075.8, dated Jun. 15, 2017, 11 pages.
XMAN Poster, "NATS—Cross Border Arrival Management (XMAN)", 2015, one page.

* cited by examiner

REVISED SPEED ADVISORY FOR AN AIRCRAFT DURING FLIGHT BASED ON HOLDING TIME

RELATED APPLICATIONS

This application claims priority to Indian patent application nos. 201641035792 and 201641035786 both filed on 19 Oct. 2016, the entire contents of which are incorporated by reference.

BACKGROUND

Airports may be constrained with increasing air traffic and may require inbound aircrafts to be put on a holding pattern on arrival routes in terminal management area (TMA). In such cases, the aircraft may consume significant amount of fuel and time in holding prior to landing the aircraft. Further, the use of the holding at any altitude may be fuel inefficient, and particularly more inefficient at lower altitudes. Also, holding may cause vertical lateral and time inefficiencies which can increase fuel costs, delays, schedule disruptions, and/or operating costs (e.g., associated with crew, aircraft and/or airline).

SUMMARY

In one embodiment, there is provided a method. The method comprises obtaining real-time data, wherein the real-time data is at least one of data associated with aircrafts in and around an airport, real-time weather information, and runway unavailability at the airport. The real-time data is analyzed. A holding time associated with an aircraft that is approaching the airport for landing is measured based on the analysis of the real-time data. A revised speed advisory is determined for the aircraft based on the holding time. The revised speed advisory is sent to a flight navigation and performance computer and/or a flight management system on-board the aircraft, wherein a speed of the aircraft is controlled based on the revised speed advisory.

In another embodiment, there is provided an aircraft comprising an on-board computing system and a flight management system communicatively coupled to the on-board computing system. The on-board computing system includes: a processor; and memory coupled to the processor. The memory comprises computer executable instructions that, when executed by the processor when the aircraft is approaching an airport for landing, cause the on-board computing system to: obtain a holding time associated with the aircraft from at least one ground-based system via a ground to air communication link, wherein the holding time associated with the aircraft is computed based on at least one of traffic congestion in and around the airport, real time weather information at the airport, and runway unavailability at the airport; and determine a revised speed advisory for the aircraft based on the holding time. The flight management system is to modify a speed of the aircraft based on the revised speed advisory.

In another embodiment there is provided an aircraft comprising an on-board computing system and a flight management system communicatively coupled to the on-board computing system. The onboard computing system comprises a processor; and memory coupled to the processor. The memory comprises computer executable instructions that, when executed by the processor when the aircraft is approaching an airport for landing, cause the on-board computing system to: obtain real-time data, analyze the real-time data; measure a holding time associated with the aircraft that is approaching the airport for landing based on the analysis of the real-time data; and determine a revised speed advisory for the aircraft based on the holding time. The real-time data is at least one of: real-time data associated with aircrafts in vicinity of the aircraft and the airport obtained using Automatic Dependent Surveillance-Broadcast (ADS-B) transmission from the aircrafts; real-time weather information at the airport obtained using at least one of the ADS-B transmission from the aircrafts and a ground to air communication link from at least one ground-based system; and runway unavailability at the airport obtained from the at least one ground-based system via the ground to air communication link. The flight management system is to modify a speed of the aircraft based on the revised speed advisory.

BRIEF DESCRIPTION OF THE DRAWINGS

Examples are described in the following detailed description and in reference to the drawings, in which.

DETAILED DESCRIPTION

Figure 1:
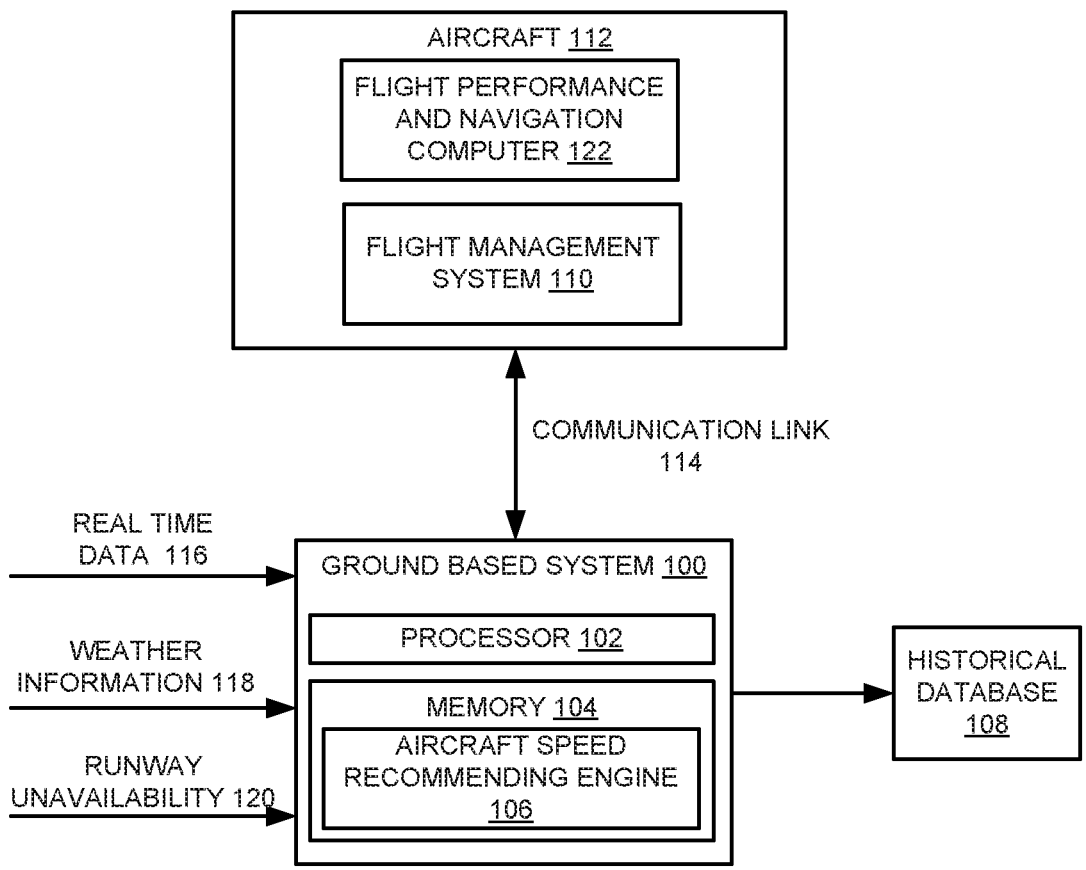
FIG. 1 is a block diagram of an example ground-based system to determine a revised speed advisory for an aircraft based on holding time.

The following examples describe a method and system for determining a revised speed advisory for an aircraft that is arriving at the airport for landing based on a holding time associated with the aircraft. In some existing methods, an aircraft may arrive within the vicinity of a destination airport and then holding patterns may be used to manage the aircraft onto the runway(s) in a sequence relative to other aircraft. The use of the holding at any altitude may be fuel inefficient, particularly more fuel inefficient at lower altitude. Generally, the communications between the ground-based station and the aircrafts in vicinity of the airport may happen using radio channels and the holding time may be communicated to the aircraft, for instance, 20 minutes in advance. The information on delay may not be sufficiently advanced to enable swapping of aircraft for flights with the aircrafts that are landing earlier. Hence, airlines may incur additional costs when the aircrafts miss the parking slots or suffer delay for subsequent flights with same aircraft due to late arrivals.

In one example, a method for controlling a speed of an aircraft approaching an airport is disclosed. Real-time data (e.g., an altitude, speed, direction, and position) associated with aircrafts in and around an airport (e.g., using ADS-B transmissions from aircrafts), real-time weather information and/or runway unavailability at the airport may be obtained. Further, a holding time associated with an aircraft that is approaching the airport for landing on a particular standard terminal arrival route (STAR)/route is measured by analyzing the real-time data associated with the aircrafts, the real-time weather information and/or the runway unavailability. Furthermore, when holding is detected in that route, a revised speed advisory is determined for the aircraft based on the holding time and the revised speed advisory is sent to a computer (e.g., class 2 navigation calculator (IPad)) and a flight management system on-board the aircraft. The speed of the aircraft is controlled based on the revised speed advisory taking into account the surrounding aircraft spacing for safety separation using ADS-B positions.

In another example, a ground-based computing system may include a processor and a memory coupled to the processor. The memory may include an aircraft speed recommending engine, to perform the above described method.

In yet another example, a non-transitory machine-readable storage medium comprising instructions executable by a processor of a computing device to perform the above described method.

In another example, a method for controlling a speed of an aircraft approaching an airport is disclosed. Real-time data (e.g., an altitude, speed, direction, and position) associated with aircrafts in and around the airport (e.g., using Automatic Dependent Surveillance-Broadcast (ADS-B) transmissions from aircrafts), real-time weather information and/or runway unavailability at the airport may be obtained by a ground-based system. Further, a holding time associated with the aircraft that is approaching the airport for landing on a particular standard terminal arrival route (STAR)/route may be measured by a data analysis engine of the ground-based system based on analysis of the real-time data associated with the aircrafts, the real-time weather information and/or the runway unavailability.

Furthermore, the holding time may be communicated to an on-board computing system of the aircraft via a ground to air communication link. Furthermore, when holding is detected in that route, a revised speed advisory for the aircraft may be determined based on the holding time by a speed recommending engine residing in memory of the on-board computing system. The revised speed advisory is communicated to a flight management system on-board the aircraft. Furthermore, a speed of the aircraft is controlled based on the revised speed advisory by the flight management system. The speed of the aircraft is controlled based on the revised speed advisory taking into account the surrounding aircraft spacing for safety separation using ADS-B positions.

In another example, an aircraft that is approaching an airport for landing may include an on-board computing system and a flight management system communicatively coupled to the on-board computing system. The on-board computing system may include a processor, and memory coupled to the processor. The memory may include an aircraft speed recommending engine to obtain a holding time associated with the aircraft that is approaching the airport for landing from at least one ground-based system via a ground to air communication link and determine a revised speed advisory for the aircraft based on the holding time. The flight management system may modify a speed of the aircraft based on the revised speed advisory.

In yet another example, an aircraft that is approaching an airport for landing may include an on-board computing system. The on-board computing system may include a speed recommending engine to obtain real time data associated with aircrafts in vicinity of the aircraft and the airport using ADS-B transmission from the aircrafts. Further, the aircraft speed recommending engine may obtain real time weather information at the airport using at least one of the ADS-B transmission from the aircrafts and a ground to air communication link from at least one ground-based system. The speed recommending engine may obtain runway unavailability at the airport from at least one ground-based system via a ground to air communication link. The speed recommending engine may measure a holding time associated with the aircraft that is approaching the airport for landing based on the analysis of the real-time data associated with the aircrafts, the real-time weather information and/or the runway unavailability. The speed recommending engine may determine a revised speed advisory for the aircraft based on the holding time. Further, the flight management system may modify a speed of the aircraft based on the revised speed advisory.

In yet another example, a non-transitory machine-readable storage medium comprising instructions executable by a computing system on-board of an aircraft to obtain a holding time associated with the aircraft that is approaching the airport for landing from at least one ground-based system via a ground to air communication link, determine a revised speed advisory for the aircraft based on the holding time and communicate/recommend the revised speed advisory to a flight management system of the aircraft.

Examples described herein may monitor movements of all aircrafts in airspace around landing airport, for instance, using automatic dependent surveillance-broadcast (ADS-B) transmissions from the aircrafts. For example, the movements of the aircrafts in vicinity (e.g., within 400 km, within 700 km) can be monitored either on-board an aircraft or on a ground-based system. Further, holding and time duration in an Air Traffic Control (ATC)/TMA area are computed in real-time either on-board the aircraft or on the ground-based system without depending on (e.g., earlier than) ATC radio transmissions. When the holding time is computed by the ground based station, the holding time may be communicated to a computing system on-board the aircraft via a ground to air communication link. When holding is detected in that route, a target speed to fly (i.e., revised speed advisory) for an inbound aircraft is computed to absorb/avoid the delay by reducing the inbound aircraft's speed into the vicinity or by speeding up and/or requesting an alternate standard terminal arrival route (STAR)/runway based on availability. Then, the target speed to fly may be communicated to the inbound aircraft's computing system (e.g., flight performance and navigation computer). When ATC/other aircraft clearances permit then the target speed to fly is transferred into flight management system to fly the aircraft based on the target speed to fly and hence may optimise the arrival time away from the periods of congestion at the airport. For example, services for air traffic management (ATM)/Runway/airport capacity assessment can be performed using open data and ADS-B data.

In another example, examples described herein may further compute the delay time caused due to bad weather condition along with the traffic congestion at destination airport (e.g., poor visibility and lack of relevant precision approach aids) and compute a target speed to fly for an aircraft that is approaching the airport based on the computed delay. Examples described herein may be used to establish real-time capacity under different operating conditions, seasons and/or peak times. For example, the weather data may be received from aircraft sensors, or other weather sources (e.g., ATC/meteorology department transmissions)

and may be provided as input to the system to estimate a trend in traffic congestion at the airport based on the weather data and ADS-B data.

In yet another example, examples described herein may compute the delay time based on runway unavailability. For example, factors such as runway repairs/closures (e.g., NOTAM data) and local events like air shows, priority air force movements, trade fairs, and/or holiday season can also be taken into account to measure the delay time in addition to ADS-B data of aircrafts and weather data. Further, examples described herein may estimate an output based on the factors and may correlate the estimated output with a schedule of the airlines to predict the delay (e.g., average, minimum, maximum or expected delay) and maintain a track of airport traffic/capacity.

Examples described herein may slow down or speed up an incoming aircraft during flight (e.g., end of cruise and approach phases) based on a computed target speed to fly in real-time to avoid flying into congestion at the airport. Examples described herein may save fuel burn and cost, reduce emissions, and improve environmental performance. Further, examples described herein may be independent of ATC information related to congestion occurrence at the airport, where the ATC information may not provide enough flight time to absorb the delay due to nature of transmission (e.g., very high frequency (VHF)). Examples described herein may provide a system and method for autonomous and early decision making on fuel/cost saving en route the aircraft (e.g., providing distance and/or time to absorb the delay). Examples described herein may assess feasibility of a target speed to fly by real-time awareness of other aircraft data and constraints around the inbound aircraft. Examples described herein may update airlines on traffic congestion and delay time durations to help manage aircraft movements (e.g., take off time or aircraft usage) using real-time big data and to minimise delays in longer term. Examples described herein may assess capacity of airports/ATC based on real-time operating data and determining necessity of additional runways. Examples described herein may provide airlines the opportunity to reduce fuel burn and delays and to operate on time.

In an example, a ground-based computing system comprises: a processor; and memory coupled to the processor. The memory includes an aircraft speed recommending engine to: obtain real-time data associated with aircrafts in and around an airport, real-time weather information and/or runway unavailability at the airport; analyze the real-time data associated with the aircrafts, the real-time weather information and/or the runway unavailability; measure a holding time associated with an aircraft that is approaching the airport for landing based on the analysis of the real-time data associated with the aircrafts, the real-time weather information and/or the runway unavailability; determine a revised speed advisory for the aircraft based on the holding time; and send the revised speed advisory to a flight performance and navigation computer and/or a flight management system on-board the aircraft.

In an example, a non-transitory machine-readable storage medium comprising instructions executable by a processor of a computing device to: obtain real-time data associated with aircrafts in and around an airport, real-time weather information and/or runway unavailability at the airport; analyze the real-time data associated with the aircrafts, the real-time weather information and/or runway unavailability; measure a holding time associated with an aircraft that is approaching the airport for landing based on the analysis of the real-time data associated with the aircrafts, the real-time weather information and/or the runway unavailability; determine a revised speed advisory for the aircraft based on the holding time; and recommend the revised speed advisory to a flight performance and navigation computer and/or a flight management system on-board the aircraft, wherein a speed of the aircraft is controlled based on the revised speed advisory.

FIG. 1 is a block diagram of an example ground-based system 100 to determine a revised speed advisory for an aircraft based on holding time. The ground-based system 100 is communicatively connected to an aircraft 112, via a communication link 114. The ground-based system 100 is associated with a historical database 108. The historical database 108 may include pre-stored procedures and pre-stored historical data associated with the airport. Example pre-stored historical data may include schedule, approach, and departure information of the aircrafts flying in and out of the airport, historical data associated with weather related disturbances, and/or historical data associated with runway unavailability. For example, past history/local weather condition/ runway conditions, and airline schedules with peaks of aircraft arrivals which may cause disruptions may be part of the pre-stored data.

The ground-based system 100 may include a processor 102, and a memory 104. The memory 104 may include an aircraft speed recommending engine 106. The aircraft 112, may include a flight management system 110 and a flight performance and navigation computer 122. In the example shown in FIG. 1, the ground-based system 100 may be shown as communicating with one aircraft, however the ground-based system 100 may communicate with any number of aircrafts.

In one example, the ground-based system 100 may be implemented by any appropriate computing system, for instance, any type of computer architecture including server/client, mainframe/terminal, personal computers (PCs), tablet computers, mobile computers and the like. The ground-based system 100 may include transmitter/receiver arrangement to communicate with aircrafts, for example, including flight management system of capable aircraft and also systems of non-capable aircraft, and pilots. In one example, the components of the ground-based system 100 may be implemented in hardware, machine-readable instructions or a combination thereof. In one example, the aircraft speed recommending engine 106 can be any combination of hardware and programming to implement the functionalities described herein.

The ground-based system 100 may receive information from a plurality of input sources to measure holding time for the aircraft 112 that is approaching the airport for landing. In one example, the aircraft speed recommending engine 106 may obtain real-time data 116 associated with the aircrafts in and around an airport, real-time weather information 118, and runaway unavailability 120 at the airport. For example, the aircraft speed recommending engine 106 may obtain the real-time data associated with the aircrafts in and around the airport using ADS-B transmissions from the aircrafts/aircraft sensors. The real-time data 116 may include ADS-B data such as an altitude, speed, direction, intent (e.g., flight plans) and position (e.g., latitude and longitude) of the aircrafts in and around the airport. The ground-based system 100 may include receivers to receive the ADS-B signals from the aircrafts in and around the airport. Alternately, real-time data 116 can also be obtained from radar, ATC and the like.

Further, the aircraft speed recommending engine 106 may analyze the real-time data 116 associated with the aircrafts, the real-time weather information 118 and/or the runway unavailability 120 to measure a holding time associated with an aircraft 112 that is approaching the airport for landing. In one example, the aircraft speed recommending engine 106 may analyze the real-time data 116 associated with the aircrafts, the real-time weather information 118 and/or the runway unavailability 120 using the pre-stored procedures and the pre-stored historical data to estimate a trend in traffic congestion, weather related disturbances, and/or runway unavailability at the airport. The aircraft speed recommending engine 106 may dynamically measure the holding time associated with an arrival route of the aircraft 112 based on the trend in traffic congestion, weather related disturbances, and/or runway unavailability at the airport at regular intervals of time. For example, a set of pre-stored procedures may check traffic congestion with reference to the historical database 108 of stored inbound procedures (e.g., if any aircraft in an ATC control area is in holding patterns during approaches in to the airport) and further process the information to measure an expected current time delay.

In one example, the real-time data 116 of the aircrafts in the vicinity of the airport may be tracked to determine a trend in traffic congestion at the airport, whether traffic congestion at the airport is increasing, or when would the traffic congestion likely occur. For example, the real-time data 116 of the aircrafts in the vicinity of the airport may be tracked to determine holding pattern associated with each aircraft in the same arrival route of the aircraft 112. The weather information 118 may include weather condition at local airfield throughout the year, such as poor visibility, flooding, and temporary airfield restrictions. Further, the weather information 118 may be received from aircraft sensors, ATC and MET department transmissions. The weather related data received from the aircraft sensors may be stored in the historical database 108.

The runaway unavailability 120, may be caused due to runaway repairs, runaway closures, local events such as air shows, VIP or Airforce movements, trade fairs, holiday season and the like, which may be known to affect the availability of a runway. This information can be obtained from NOTAM, airport information, airline information, local news, historical database and the like.

The aircraft speed recommending engine 106 may measure the holding time associated with the aircraft 112 based on holding pattern associated with each of the aircrafts that are in and around the airport and are in a same arrival route of the aircraft 112 that is approaching the airport for landing. For example, the arrival route may include a STAR, continuous descent approaches (CDA), required navigation performance (RNP) approach or other similar routes. Further, the holding time may be measured for all aircrafts that are in and around the airport and the revised speed advisory based on the measured holding time may be calculated for specific airlines that are registered for the service. The ground-based system 100 may analyze the holding patterns and time separation between different types of aircrafts in a given location based on the provided input data to estimate the congestion and delay (e.g., in terms of wait/circling time of the aircrafts in and around the airport).

Furthermore, the aircraft speed recommending engine 106 may determine a revised speed advisory for the aircraft 112 based on the holding time. For example, the revised speed advisory may be computed for the aircraft 112 based on the delay/holding time such that the aircraft 112 arrive at the target point in space at a slower pace and avoid/minimize time spent circling in the congested airspace.

The aircraft speed recommending engine 106 may send the revised speed advisory to a computing system (e.g., flight performance and navigation computer 122), for example, via a communication link and after acceptance the revised speed advisory is sent to a flight management system 110 on-board the aircraft 112. The communication link 114 may include a controller-pilot data link communication (CPDLC), satellite communication, or a ground-air data link communication. The aircraft speed recommending engine 106 may determine whether the revised speed advisory can be flown taking into account real-time traffic substantially around the aircraft 112 for safety separation and send the revised speed advisory to the computing system and/or flight management system on-board the aircraft 112 based on the determination, i.e., when there is no obstruction in a flight path associated with the aircraft 112. In another example, the revised speed advisory and/or trajectory of the aircraft 112 may be negotiated with ATC considering adjacent aircraft intent/plans and revised speed advisory or trajectory may be sent to the aircraft's on-board computing system and/or the flight management system to fly at the revised speed to avoid the congestion upon accepting the revised speed advisory by the pilot. In one example, the revised speed advisory is communicated to the inbound aircraft's computing system (e.g., flight performance and navigation computer 122) and when ATC/other aircraft clearances permit, then the revised speed advisory is provided into flight management system to fly the aircraft based on the revised speed advisory.

The flight management system 110 on-board the aircraft 112 may control a speed of the aircraft 112 based on the revised speed advisory towards an end of a cruise phase and/or during a descent phase. The revised speed advisory may include an instruction to either reduce the aircraft speed, or increase the aircraft speed to avoid congestion. For example, the speed of the aircraft 112 is reduced to absorb at least some part of the holding time of the aircraft 112 by saving fuel. Alternately, the speed of the aircraft 112 can be increased to reach the airport before congestion increases, thereby saving flight time.

In one example, the revised speed advisory can be accepted by a pilot flying the aircraft 112 to arrive at the congested airspace slower and burn less fuel at a lower throttle setting. Further, a long period of circling by entering the congested airspace at an original speed, can be avoided, as previous aircrafts would have been cleared due to time added to an arrival time of the aircraft 112. In some examples, the aircraft 112 can fly faster to reach the airport before congestion increases (e.g., to avoid significant circling) when the situation is predicted to worsen (e.g., local weather/visibility conditions likely to worsen making landing difficult and/or many scheduled arrivals during or after that time).

Conditions of the airspace around the airport can be tracked at regular intervals of time to assess the congestion and to further revise speed advisory, if needed. When a position of the aircraft 112, is known to the ground-based system 100, the revised speed advisory may be calculated by the ground-based system 100 for transmission to the aircraft 112. In another example, the revised speed can also be calculated on-board the aircraft 112 by communicating delay/holding time or persistence of bad weather/visibility at airport to the aircraft 112 through a communication link.

In some examples, the aircraft speed recommending engine 106 may be implemented as part of aircraft-based, partly aircraft-based and partly ground-based, or totally ground-based. For example, in one implementation, the aircraft speed recommending engine 106 may be implemented by the on-board computing system (e.g., flight performance and navigation computer 122). In another embodiment, the aircraft speed recommending engine 106 may be implemented totally by the ground-based system 100 (e.g., as shown in FIG. 1). In yet another example, the aircraft speed recommending engine can be implemented partly in the ground-based system 100 (e.g., to measure holding time based on analyzing the real-time input data 116, 118 and 120) and partly in the aircraft's on-board computing system 122 (e.g., receive measured holding time from the ground-based system 100 and determine revised speed advisory).

For example, the aircraft speed recommending engine (e.g., in the ground-based system or in the aircraft) may collect/gather data, analyse all approaches into an aerodrome, correlate delay trends, and calculate a revised navigation/speed to fly for the inbound aircraft.

The aircraft speed recommending engine 106 may include computer-readable storage medium comprising (e.g., encoded with) instructions executable by the processor 102, to implement functionalities as described above. In some examples, the functionalities described herein in relation to instructions to implement functions of the aircraft speed recommending engine 106, any additional instructions described herein in relation to storage medium, may be implemented as engines or modules comprising any combination of hardware and programming to implement the functionalities of the modules or engines, as described above. The functions of the aircraft speed recommending engine 106 may be implemented by computing devices which may be servers, blade enclosures, desktop computers, laptops (or notebooks) computers, workstations, tablet computers, mobile phones, smart devices, or any other processing devices or equipment including a processing resource. In examples described herein, a processor may include, for example, one processor or multiple processors included in a single computing device or distributed across multiple computing devices.

Figure 2:
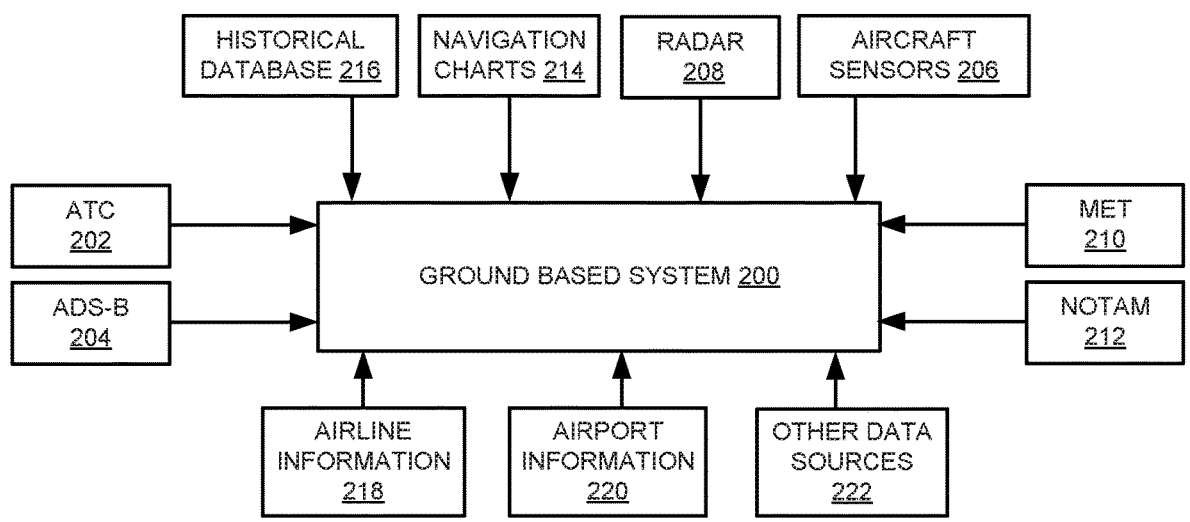
FIG. 2 is a block diagram depicting example input data sources for determining the holding time and revised speed advisory for an aircraft.

FIG. 2 is a block diagram depicting example input data sources for determining the holding time and revised speed advisory for an aircraft. The input data sources may provide real-time data associated with the aircrafts in and around the airport, the real-time weather information at the airport, runway unavailability at the airport, and historical data to a ground-based system 200. For example, the ATC 202, ADS-B 204, aircraft sensors 206, and/or radar 208 may provide real-time data associated with the aircrafts in and around the airport. MET 210, ATC 202, and aircraft sensors 206 may provide real-time weather related information at the airport. NOTAM 212 may provide runway unavailability information at the airport. Navigation charts 214, historical database 216, airline information 218 and airport information 220 may provide pre-stored historical data such as schedule, approach, departure information, and arrival route (e.g., STAR) of the aircrafts flying in and out of the airport, historical data associated with weather related disturbances, and/or historical data associated with runway unavailability. Other data sources 222 can provide information related to holiday data, trade fairs, airshows, and flooding at the airports.

Figure 3:
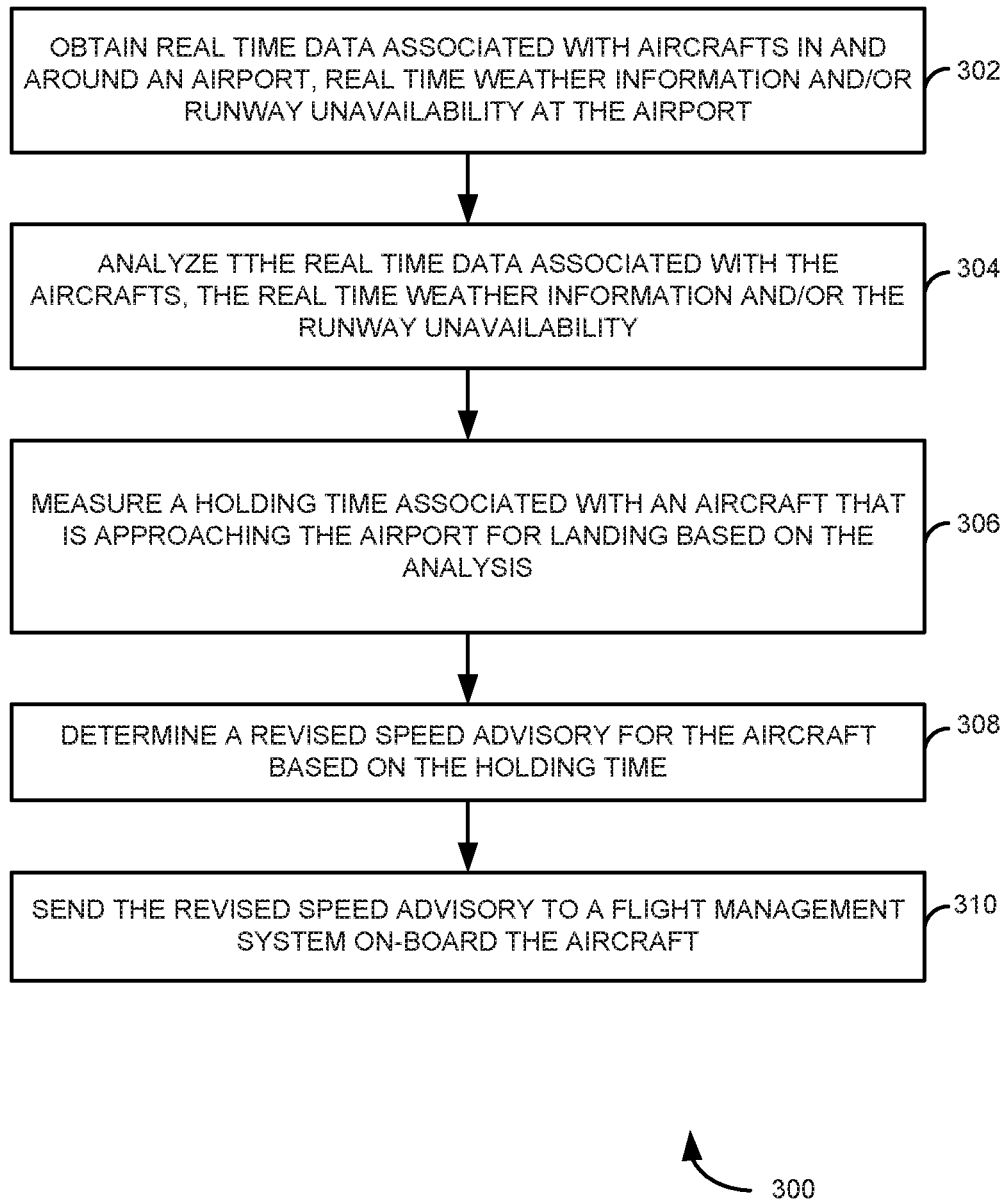
FIG. 3 depicts an example flow chart for determining and sending the revised speed advisory to a flight management system on-board the aircraft.

FIG. 3 depicts an example flowchart 300 for determining and sending a revised speed advisory to a flight management system on-board the aircraft. It should be understood the process depicted in FIG. 3 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flowchart is not intended to limit the implementation of the present application, but rather the flow charts illustrate functional information to design/fabricate circuits, generate machine-readable instructions, or use a combination of hardware and machine-readable instructions to perform the illustrated processes.

At 302, real-time data associated with aircrafts in and around an airport, real-time weather information and/or runway unavailability at the airport may be obtained/received. In one example, the real-time data associated with the aircrafts in and around the airport may be obtained using ADS-B transmissions from the aircrafts. Example real-time data may include ADS-B data such as an altitude, speed, direction, and position (e.g., latitude and longitude) of the aircrafts in and around the airport.

At 304, the real-time data associated with the aircrafts, the real-time weather information and/or the runway unavailability may be analyzed. In one example, the real-time data associated with the aircrafts, the real-time weather information and/or the runway unavailability may be analyzed (e.g., at regular intervals) using pre-stored procedures and pre-stored historical data to estimate a trend in traffic congestion, weather related disturbances, and/or runway unavailability at the airport. Example pre-stored historical data may include schedule, approach, and departure information of the aircrafts flying in and out of the airport, historical data associated with weather related disturbances, and/or historical data associated with runway unavailability. Pre-stored procedures may refer to collections of pre-defined procedural code that may be used to perform one or more tasks such as, for example, analyzing the real-time data associated with the aircrafts, the real-time weather information and/or the runway unavailability to determine a trend in congestion at the airport. The pre-stored procedures and pre-stored data may be on the same computer system (i.e., ground-based system) or may be on separate systems, in communication via a network connection.

At 306, a holding time associated with an aircraft that is approaching the airport for landing is measured based on the analysis of the real-time data associated with the aircrafts, the real-time weather information and/or the runway unavailability. In one example, the holding time associated with the aircraft may be measured at regular intervals of time based on the trend in traffic congestion, weather related disturbances, and/or runway unavailability at the airport. The holding time associated with the aircraft may be measured based on holding pattern associated with each of the aircrafts that are in and around the airport and are in a same arrival route (e.g., STAR, CDA and the like) of the aircraft that is approaching the airport for landing.

For example, the process to detect holds from ADS-B data may be as follows:
1. Raw ADS-B data may be inputted from the sensors of aircrafts in and around the airport.
2. Approaching flights belonging to a particular call-sign/airline of interest may be filtered.
3. Valid individual flights that are descending into the airport are detected and an identifier may be assigned to each detected flight to separate the aircraft parameters of the detected flights from all other records.
4. Further the aircraft parameters of the detected flights may be processed to check or improve quality of the relevant aircraft parameters.
5. Holds/loops associated with the detected flights may be determined. An example for detecting holds/loops is explained below.
6. Detected flights with holds/loops, holding durations, number of circles done, and/or date and time stamp of meteorological terminal aviation routine (METAR) weather comparison link may be outputted.

For example, detecting holds/loops associated with the detected flights may be as follows:
1. Consider a holding period per circle is ~4 minutes (e.g., range of 3-5 minutes) at a speed in the range of 220-280 Knots.
2. A closed loop may be identified, when two reported coordinates are found to be closer than 1 KM, for example, within the time interval.
3. Also, for robustness, a check on heading change by more than 45 degrees, for example, between the loop start and halfway of the loop may be performed. In addition, heading changes derived from latitude and longitude information of the flights may be checked for greater than 180° turn away from the first heading.

At 308, a revised speed advisory for the aircraft may be determined based on the holding time. In one example, the revised speed advisory may be determined by converting the measured holding time associated with the aircraft into fuel savings or time savings along a flight path associated with the aircraft. The revised speed advisory may reduce the speed of the aircraft to absorb at least some part of the holding time of the aircraft by saving fuel or increase the speed of the aircraft to reach the airport before congestion increases by saving flight time.

In an example, for determining the holding time in an aircraft trajectory and revised speed to fly for any subsequent trailing aircraft on same arrival/descent route into TMA:
1. Check the latitude, longitude changes at regular intervals, for example every few seconds, repetitively considering the aircraft speed to determine whether the aircraft is looping back (e.g., the latitude and longitude position with time stepping will not change significantly to match the minimum distance which can be flown for the speed).
2. Also, cross check the heading changes to determine circular/race track pattern (e.g., both from reported heading and latitude-longitude change derived heading, i.e., cross comparing to eliminate sampling/low refresh rate errors).
3. Cross check with respect to the published holding points and standard terminal arrival route (STAR) holding zones prescribed in the ATC to determine if the aircraft is in correct latitude and longitude range and allowed height range (e.g., within maximum deviation).
4. Perform a minimum distance check from the runway to eliminate separation increase maneuvers from other aircrafts or height reducing maneuvers.
5. When the results are true for a hold in the flight trajectory, count the number of loops flown and time for each loop and also time for total number of loops per holding of the aircraft.
6. Thus, a holding time for one aircraft is determined as seen by the ADS-B receiver in the ATC airspace. Determine a moving average of the holding time if there is more than one aircraft.
7. Cross check for weather (e.g., bad visibility and rain) from METAR weather report and/or any available weather information reported by aircrafts (e.g., ADS-B/AMDAR (aircraft meteorological data relay)) to check for persistence.
8. The average delay seen during a particular time/event for the aircraft on same STAR route is what needs to be compensated for the trailing aircraft to prevent wasting time and fuel, and time/speed compensation reduction may be transmitted into the flight plan modification for the trailing aircraft. This can be performed either on-board of an aircraft (e.g., using flight management system, tablet or ipad) or can be calculated and transmitted to the aircraft from a ground-based computer.
9. The average time of hold may be used to calculate a new speed for the aircraft on the same STAR route behind holding aircraft, i.e., saving fuel in descent and also saving fuel and time spent in holding pattern.

At 310, the revised speed advisory is sent to a flight navigation and performance computer and/or a flight management system on-board the aircraft. The speed of the aircraft is controlled based on the revised speed advisory. In one example, the target speed to fly is communicated to the inbound aircraft's flight performance and navigation computer and when ATC/other aircraft clearances permit then the target speed to fly is transferred into flight management system to fly the aircraft based on the target speed to fly.

In one example, the revised speed advisory may be sent to the flight navigation and performance computer on-board the aircraft by determining whether the revised speed advisory can be flown taking into account real-time traffic substantially around the aircraft for safety separation and sending the revised speed advisory to the flight navigation and performance computer on-board the aircraft when there is no obstruction in a flight path associated with the aircraft. The speed of the aircraft may be controlled towards an end of a cruise phase and/or during a descent phase.

Figure 4:
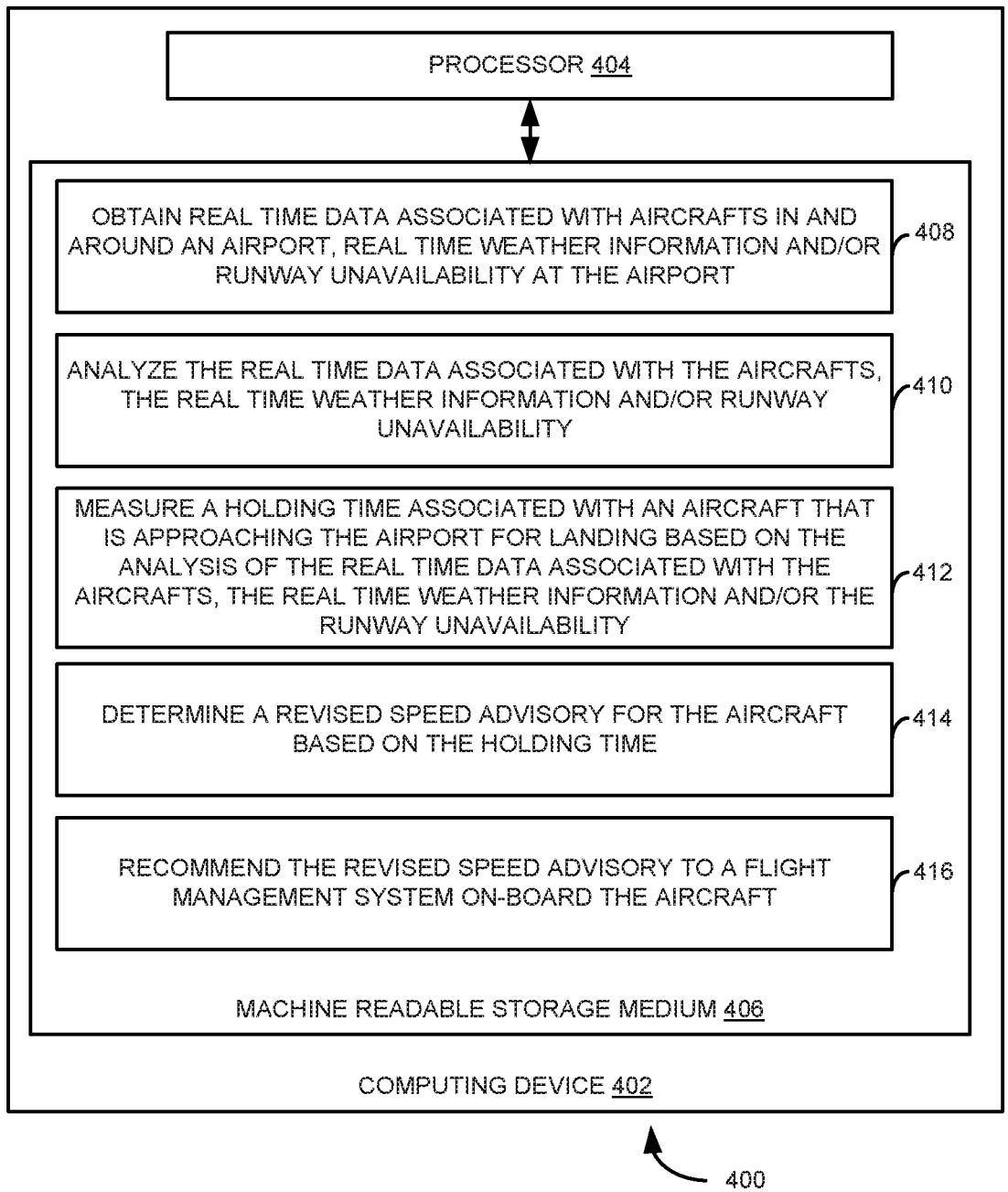
FIG. 4 depicts an example block diagram of an example computing device for determining a revised speed advisory based on holding time.

FIG. 4 is a block diagram 400 of an example computing device 402 (e.g., as part of a ground based system or on-board aircraft computing system) for determining a revised speed advisory based on holding time. In the example of FIG. 4, a computing device 402 may include a processor 404 and a machine-readable storage medium 406. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 404 may be one or more central processing units (CPUs), microprocessors, and/or other hardware devices suitable for retrieval and execution of instructions stored in machine-readable storage medium 406. In the particular example shown in FIG. 4, processor 404 may fetch, decode, and execute instructions 408-416 to determine a revised speed advisory for an aircraft based on holding time.

As an alternative or in addition to retrieving and executing instructions, processor 404 may include one or more electronic circuits comprising a number of electronic components for performing the functionality of one or more of the instructions in machine-readable storage medium 406. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 406 may be any electronic, magnetic, optical, or other physical storage device that stores executable instructions. Thus, machine-readable storage medium 406 may be, for example, Random Access Memory (RAM), an Electrically-Erasable Programmable Read-Only Memory (EEPROM), a storage drive, an optical disc, and the like. Machine-readable storage medium 406 may be disposed within computing device 402, as shown in FIG. 4. In this situation, the executable instructions may be "installed" on the computing device 402. Alternatively, machine-readable storage medium 406 may be a portable, external or remote storage medium, for example, that allows computing device 402 to download the instructions from the portable/external/remote storage medium.

The machine-readable storage media 406 may store instructions 408-416. In an example, instructions 408-416 may be executed by processor 404 on the computing device 402 to provide a mechanism for implementation of the aircraft speed recommendation process. Instructions 408 may be executed by processor 404 to obtain real-time data associated with aircrafts, in and around an airport, real-time weather information and/ or runway unavailability at the airport. Instructions 410 may be executed by processor 404 to analyze the real-time data associated with the aircrafts, the real-time weather information and/or the runway unavailability. Further, instructions 412 may be executed by processor 404 to measure a holding time associated with an aircraft that is approaching the airport for landing. The holding time may be measured based on analysis of real-time data associated with the aircrafts, the real-time weather information, and/or the runway unavailability. Instructions 414 may be executed by the processor 404 to determine a revised speed advisory for the aircraft based on the holding time. Instructions 416 may be executed by the processor 404 to send the revised speed advisory to a flight navigation and performance computer and then to a flight management system on-board the aircraft. A speed of the aircraft may be controlled based on the revised speed advisory.

Figure 5:
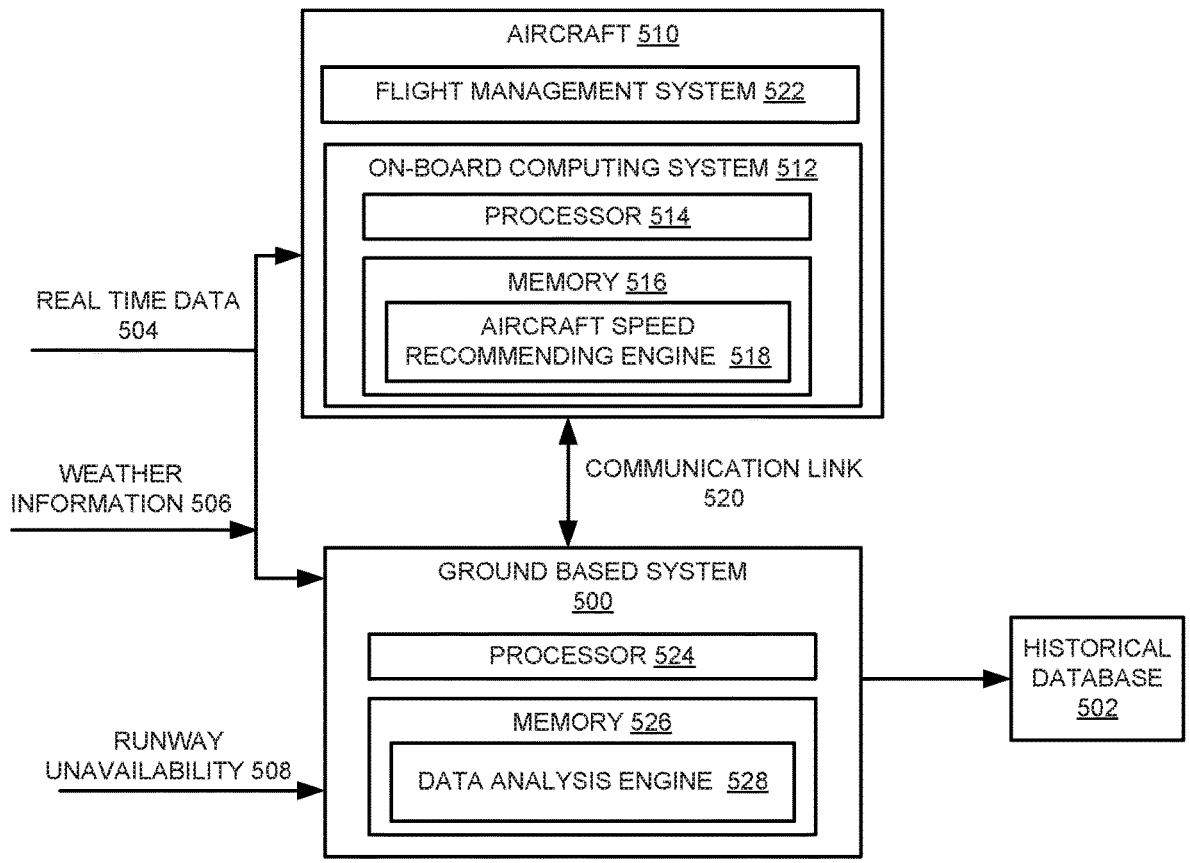
FIG. 5 is a block diagram of an example system to determine a revised speed advisory on-board of an aircraft based on holding time.

FIG. 5 is a block diagram of an example system for determining a revised speed advisory on-board an aircraft 510 based on holding time. The system includes the aircraft 510, a ground-based system 500, and a historical database 502. The aircraft 510 may be communicatively connected to the ground-based system 500 via a communication link 520. The aircraft 510 may include an on-board computing system 512 (e.g., flight performance and navigation computer) and a flight management system 522. The flight management system 522 may provide the primary navigation, flight planning, optimized route determination and en route guidance for the aircraft 510 and may include interrelated functions such as navigation, flight planning, trajectory prediction, performance computations, and/or guidance.

The flight management system 522 may consist of a computer unit and a control display unit. The computer unit can be a standalone unit providing both the computing platform and various interfaces to other avionics. The control display unit may provide the primary human/machine interface for data entry and information display. On-board computing system 512 may include any computing device such as personal computers (PCs), tablet computers, ipads, mobile computers and the like.

The on-board computing system 512 may include a processor 514, and a memory 516. The memory 516 may include an aircraft speed recommending engine 518. In the example shown in FIG. 1, the aircraft speed recommending engine 518 is shown as residing in on-board computing system 512, however, aircraft speed recommending engine 518 can also be implemented as a part of flight management system 522. Further, the ground-based system 500 may include a processor 524, and a memory 526. The memory 526 may include a data analysis engine 528.

In one example, the ground-based system 500 may obtain real-time data 504 associated with the aircrafts in and around an airport, real-time weather information 506, and runaway unavailability 508 at the airport. The ground-based system 500 may receive information from a plurality of input sources to measure holding time for the aircraft 510 that is approaching the airport for landing. For example, the data analysis engine 528 may obtain the real-time data 504 associated with the aircrafts in and around the airport using ADS-B transmissions from the aircrafts/aircraft sensors. The real-time data 504 may include ADS-B data such as an altitude, speed, direction, intent (e.g., flight plans) and position (e.g., latitude and longitude) of the aircrafts in and around the airport. The ground-based system 500 may include receivers to receive the ADS-B signals from the aircrafts in and around the airport. Alternately, real-time data 504 can also be obtained from radar, ATC and the like.

Further, the weather information 506 may include weather condition at local airfield throughout the year, such as poor visibility, flooding, and temporary airfield restrictions. Further, the weather information 506 may be received from aircraft sensors, ATC and MET department transmissions. The weather related data received from the aircraft sensors may be stored in the historical database 502.

Furthermore, the runaway unavailability 508, may be caused due to runaway repairs, runaway closures, local events such as air shows, VIP or Airforce movements, trade fairs, holiday season and the like, which may be known to affect the availability of a runway. This information can be obtained from NOTAM, airport information, airline information, local news, historical database and the like.

Further, the data analysis engine 528 may dynamically measure a holding time associated with the aircraft 510 that is approaching the airport for landing by analyzing the real-time data 504 associated with the aircrafts, the real-time weather information 506 and/or the runway unavailability 508. In one example, real-time data 504 associated with the aircrafts, the real-time weather information 506 and/or the runway unavailability 508 may be analyzed using pre-stored procedures and pre-stored historical data in the historical database 502 to estimate trend in traffic congestion, weather related disturbances, and/or runway unavailability at the airport.

The historical database 502 may include the pre-stored procedures and pre-stored historical data associated with the airport. Example pre-stored historical data may include schedule, approach, and departure information of the aircrafts flying in and out of the airport, historical data associated with weather related disturbances, and/or historical data associated with runway unavailability. For example, past history/local weather condition/runway conditions, and airline schedules with peaks of aircraft arrivals which may cause disruptions may be part of the pre-stored data.

The data analysis engine 528 may dynamically measure the holding time associated with an arrival route of the aircraft 510 based on the trend in traffic congestion, weather related disturbances, and/or runway unavailability at the airport at regular intervals of time. For example, a set of pre-stored procedures may check traffic congestion with reference to the historical database 502 of stored inbound procedures (e.g., if any aircraft in an ATC control area is in holding patterns during approaches in to the airport) and further process the information to measure an expected current time delay.

In one example, the real-time data 504 of the aircrafts in the vicinity of the airport may be tracked to determine a trend in traffic congestion at the airport, whether traffic congestion at the airport is increasing, or when would the traffic congestion likely occur. For example, the real-time data 504 of the aircrafts in the vicinity of the airport may be tracked to determine holding pattern associated with each aircraft in the same arrival route of the aircraft 510. The data analysis engine 528 may measure the holding time associated with the aircraft 510 based on holding pattern associated with each of the aircrafts that are in and around the airport and are in a same arrival route of the aircraft 510 that is approaching the airport for landing.

For example, the arrival route may include a STAR, continuous descent approaches (CDA), required navigation performance (RNP) approach or other similar routes. Further, the holding time may be measured for all aircrafts that are in and around the airport and the revised speed advisory based on the measured holding time may be calculated for specific airlines that are registered for the service. The ground-based system 500 may analyze the holding patterns and time separation between different types of aircrafts in a given location based on the provided input data to estimate the congestion and delay (e.g., in terms of wait/circling time of the aircrafts in and around the airport).

The ground-based system 500 may send the measured holding time to the on-board computing system 512 in the aircraft 510 via the ground to air communication link 520. Example ground to air communication link 520 may include a controller-pilot data link communication (CPDLC), satellite communication, or a ground-air data link communication. The aircraft speed recommending engine 518 in the on-board computing system 512 may receive the holding time associated with the aircraft 510 that is approaching the airport for landing and determine a revised speed advisory for the aircraft 510 based on the holding time, and recommend the revised speed to the flight management system 522. For example, the revised speed advisory may be computed for the aircraft 510 based on the delay/holding time such that the aircraft 510 arrive at the target point in space at a slower pace and avoid/minimize time spent circling in the congested airspace. The flight management system 522 may modify a speed of the aircraft 510 based on the revised speed advisory upon negotiating the revised speed advisory of the aircraft 510 with ATC considering adjacent aircraft intent/plans for safety separation.

The aircraft speed recommending engine 518 may determine whether the revised speed advisory can be flown taking into account real-time traffic substantially around the aircraft 510 for safety separation and send the revised speed advisory to the flight management system 522 on-board the aircraft 510 based on the determination, i.e., when there is no obstruction in a flight path associated with the aircraft 510. In another example, the revised speed advisory and/or trajectory of the aircraft 510 may be negotiated with ATC considering adjacent aircraft intent/plans and revised speed advisory or trajectory may be sent to the aircraft's flight management system 522 to fly at the revised speed to avoid the congestion upon accepting the revised speed advisory by the pilot. In one example, when ATC/other aircraft clearances permit, the revised speed advisory may be provided into flight management system 522 to fly the aircraft 510 based on the revised speed advisory.

The flight management system 522 on-board the aircraft 510 may control a speed of the aircraft 510 based on the revised speed advisory towards an end of a cruise phase and/or during a descent phase. The revised speed advisory may include an instruction to either reduce the aircraft speed, or increase the aircraft speed to avoid congestion. For example, the speed of the aircraft 510 is reduced to absorb at least some part of the holding time of the aircraft 510 by saving fuel. Alternately, the speed of the aircraft 510 can be increased to reach the airport before congestion increases, thereby saving flight time.

In one example, the revised speed advisory can be accepted by a pilot flying the aircraft 510 to arrive at the congested airspace slower and burn less fuel at a lower throttle setting. Further, a long period of circling by entering the congested airspace at an original speed, can be avoided, as previous aircrafts would have been cleared due to time added to an arrival time of the aircraft 510. In some examples, the aircraft 510 can fly faster to reach the airport before congestion increases (e.g., to avoid significant circling) when the situation is predicted to worsen (e.g., local weather/visibility conditions likely to worsen making landing difficult and/or many scheduled arrivals during or after that time). Conditions of the airspace around the airport can be tracked at regular intervals of time to assess the congestion and to further revise speed advisory, if needed.

In another example, the aircraft speed recommending engine 518 may obtain real-time data 504 associated with aircrafts in vicinity of the aircraft 510 and in and around an airport using ADS-B transmission directly from the aircrafts. Further, the aircraft speed recommending engine 518 may obtain real time weather information at the airport using at least one of the ADS-B transmission from the aircrafts and a ground to air communication link from at least one ground-based system. In one example, the aircraft speed recommending engine 518 may receive real-time weather information 506 from the ground-based service using Automatic Terminal Information Service (ATIS). ATIS may be a continuous broadcast of recorded aeronautical information in busier terminal (i.e. airport) areas to broadcast essential information, such as weather information. In another example, the aircraft speed recommending engine 518 may obtain real time weather information at the airport using the ADS-B transmission from the other aircrafts.

Furthermore, the aircraft speed recommending engine 518 may receive runway unavailability 508 at the airport from at least one ground-based system (e.g., ground-based system 500) via the ground to air communication link (e.g., 520). The aircraft speed recommending engine 518 may analyze the real-time data 504 associated with the aircrafts, the real-time weather information 506 and/or the runway unavailability 508 (e.g., using pre-stored procedures and pre-stored data in the historical database 502) to measure a holding time of the aircraft 510 that is approaching the airport for landing. The pre-stored historical data may include schedule, approach, and departure information of the aircrafts flying in and out of the airport, historical data associated with weather related disturbances, and/or historical data associated with runway unavailability. The pre-stored procedures and the pre-stored historical data are obtained from the at least one ground-based system. In one example, the aircraft data stored in the historical database 502 can be updated to the aircraft along with flight plans before next a flight, for instance, via a ground gate data link at airports. A portion of data pertinent for the aircrafts next route, i.e., limited to destination and alternate airports en route can be updated on a flight to flight basis at aircraft turnaround on ground, via the ground gate data link. The learning or history part for that region/airport that the aircraft is going to be flying can be paired. Alternately, the pre-stored procedures and the pre-stored historical data can also be sent to the aircraft during flight via a ground to air communication link.

The aircraft speed recommending engine 518 may determine a revised speed advisory for the aircraft 510 based on the holding time and recommend the revised speed to the flight management system 522. The flight management system 522 may modify a speed of the aircraft 510 based on the revised speed advisory upon negotiating the revised speed advisory of the aircraft 510 with ATC considering adjacent aircraft intent/plans for safety separation.

In some examples, the aircraft speed recommending engine 518 may be implemented as part of aircraft-based, partly aircraft-based and partly ground-based, or totally ground-based. For example, in one implementation, the aircraft speed recommending engine 518 may be implemented by the on-board computing system 512 (e.g., as shown in FIG. 5). In another embodiment, the aircraft speed recommending engine 518 may be implemented totally by the ground-based system 500. In yet another example, the aircraft speed recommending engine 518 can be implemented partly in the ground-based system 500 (e.g., to measure holding time based on analyzing the real-time input data 504, 506 and 508) and partly in the aircraft's on-board computing system 512 (e.g., receive measured holding time from the ground-based system 500 and determine revised speed advisory).

In one example, where the aircraft 510 is outside an ADS-B monitoring range of an airport, delay/holding time, runway unavailability and/or persistence of bad weather/visibility at aerodrome can be communicated to aircraft 510 through a ground-to-air communication link 520, and a calculation of a revised speed for the aircraft 510, can be done on-board the aircraft 510. For example, the aircraft speed recommending engine (e.g., in the ground-based system or in the aircraft) may collect/gather data, analyse all approaches into an aerodrome, correlate delay trends, and calculate a revised navigation/speed to fly for the inbound aircraft.

The aircraft speed recommending engine 518 in the aircraft 510, may include computer-readable storage medium comprising (e.g., encoded with) instructions executable by the processor 514, to implement functionalities as described above. In some examples, the functionalities described herein in relation to instructions to implement functions of the aircraft speed recommending engine 518, any additional instructions described herein in relation to storage medium, may be implemented as engines or modules comprising any combination of hardware and programming to implement the functionalities of the modules or engines, as described above. The functions of the aircraft speed recommending engine 518 may be implemented by computing devices which may be servers, blade enclosures, desktop computers, laptops (or notebooks) computers, workstations, tablet computers, mobile phones, smart devices, or any other processing devices or equipment including a processing resource. In examples described herein, a processor may include, for example, one processor or multiple processors included in a single computing device or distributed across multiple computing devices.

In one example, the ground-based system 500 may be implemented by any appropriate computing system, for instance, any type of computer architecture including server/client, mainframe/terminal, personal computers (PCs), tablet computers, mobile computers and the like. The ground-based system 500 may include transmitter/receiver arrangement to communicate with aircrafts, for example, including flight management system of capable aircraft and also systems of non-capable aircraft, and pilots. In one example, the components of the ground-based system 500 may be implemented in hardware, machine-readable instructions or a combination thereof. In one example, the data analysis engine 528 can be any combination of hardware and programming to implement the functionalities described herein.

The example input data sources described above with reference to FIG. 2 for determining the holding time and revised speed advisory for an aircraft can also be used with the system of FIG. 5 (e.g., such as the ground-based system 500 of FIG. 5).

Figure 6:
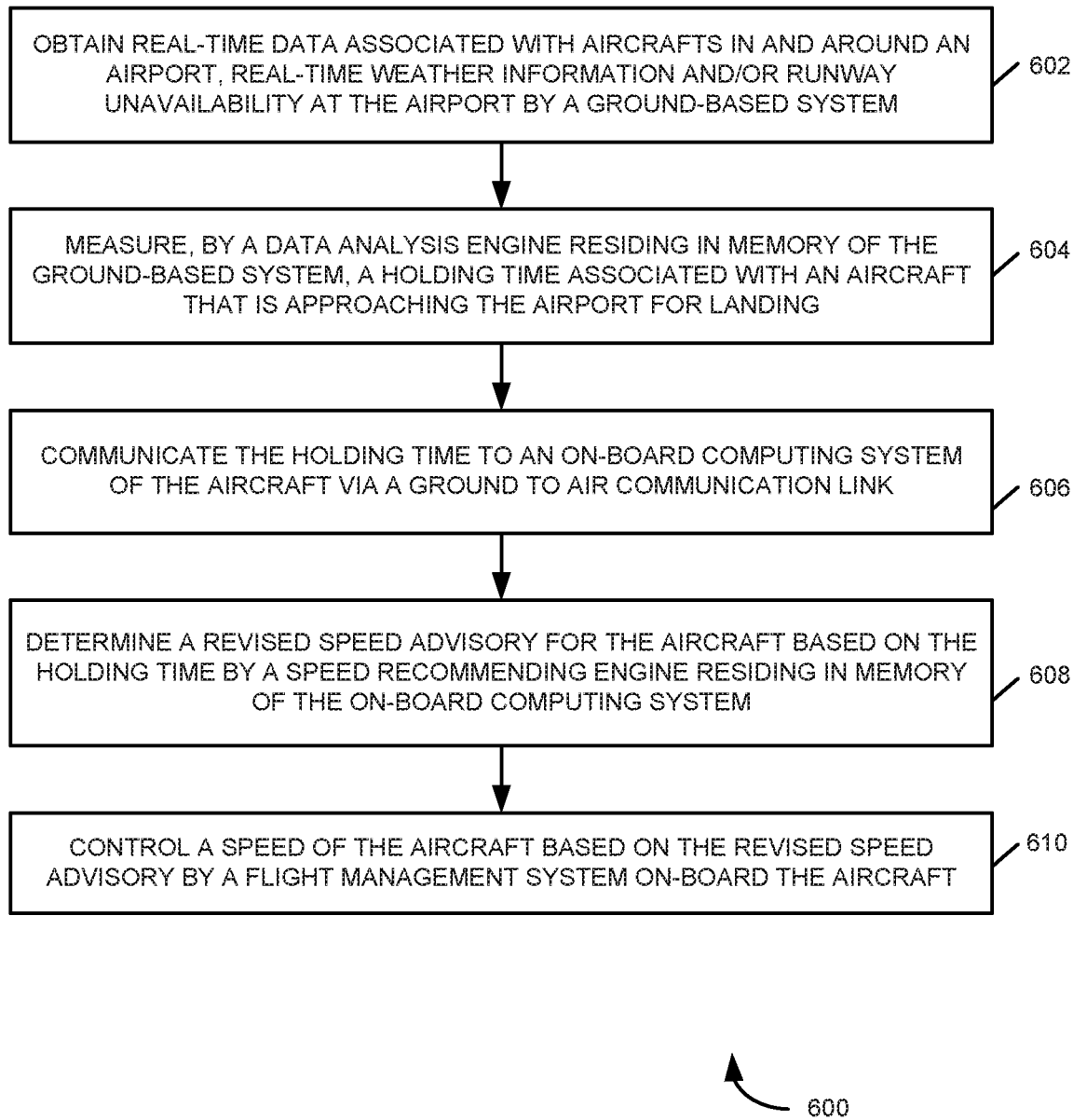
FIG. 6 depicts an example flow chart for determining a revised speed advisory on-board of an aircraft.

FIG. 6 depicts an example flow chart 600 for determining a revised speed advisory on-board of an aircraft. It should be understood the process depicted in FIG. 6 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flowchart is not intended to limit the implementation of the present application, but rather the flow charts illustrate functional information to design/fabricate circuits, generate machine-readable instructions, or use a combination of hardware and machine-readable instructions to perform the illustrated processes.

At 602, real-time data associated with aircrafts in and around an airport, real-time weather information and/or runway unavailability at the airport may be obtained/received, for example, by a ground-based system. In one example, the real-time data associated with the aircrafts in and around the airport may be obtained using ADS-B transmissions from the aircrafts. Example real-time data may include ADS-B data such as an altitude, speed, direction, and position (e.g., latitude and longitude) of the aircrafts in and around the airport.

At 604, a holding time associated with an aircraft that is approaching the airport for landing may be measured by a data analysis engine residing in memory of the ground-based system. In one example, the holding time associated with the aircraft may be measured based on the analysis of the real-time data associated with the aircrafts, the real-time weather information and/or the runway unavailability. The real-time data associated with the aircrafts, the real-time weather information and/or the runway unavailability may be analyzed (e.g., at regular intervals) using pre-stored procedures and pre-stored historical data to estimate a trend in traffic congestion, weather related disturbances, and/or runway unavailability at the airport. Example pre-stored historical data may include schedule, approach, and departure information of the aircrafts flying in and out of the airport, historical data associated with weather related disturbances, and/or historical data associated with runway unavailability. Pre-stored procedures may refer to collections of pre-defined procedural code that may be used to perform one or more tasks such as, for example, analyzing the real-time data associated with the aircrafts, the real-time weather information and/or the runway unavailability to determine a trend in congestion at the airport. The pre-stored procedures and pre-stored data may be on the same computer system (i.e., ground-based system) or may be on separate systems, in communication via a network connection.

In one example, the holding time associated with the aircraft may be dynamically measured at regular intervals of time based on the trend in traffic congestion, weather related disturbances, and/or runway unavailability at the airport. The holding time associated with the aircraft may be measured based on holding pattern associated with each of the aircrafts that are in and around the airport and are in a same arrival route (e.g., STAR, CDA and the like) of the aircraft that is approaching the airport for landing.

For example, the process to detect holds from ADS-B data may be as follows:
1. Raw ADS-B data may be inputted from the sensors of aircrafts in and around the airport.
2. Approaching flights belonging to a particular call-sign/airline of interest may be filtered.
3. Valid individual flights that are descending into the airport are detected and an identifier may be assigned to each detected flight to separate the aircraft parameters of the detected flights from all other records.
4. Further the aircraft parameters of the detected flights may be processed to check or improve quality of the relevant aircraft parameters.
5. Holds/loops associated with the detected flights may be determined. An example for detecting holds/loops is explained below.
6. Detected flights with holds/loops, holding durations, number of circles done, and/or date and time stamp of meteorological terminal aviation routine (METAR) weather comparison link may be outputted.

For example, detecting holds/loops associated with the detected flights may be as follows:
1. Consider a holding period per circle is ~4 minutes (e.g., range of 3-5 minutes) at a speed in the range of 220-280 Knots.
2. A closed loop may be identified, when two reported coordinates are found to be closer than 1 KM, for example, within the time interval.
3. Also, for robustness, a check on heading change by more than 45 degrees, for example, between the loop start and halfway of the loop may be performed. In addition, heading changes derived from latitude and longitude information of the flights may be checked for greater than 180° turn away from the first heading.

At 606, the holding time is communicated to an on-board computing system of the aircraft via a ground to air communication link. At 608, a revised speed advisory for the aircraft may be determined based on the holding time by a speed recommending engine residing in memory of the on-board computing system. In one example, the revised speed advisory may be determined by converting the measured holding time associated with the aircraft into fuel savings or time savings along a flight path associated with the aircraft. The revised speed advisory may reduce the speed of the aircraft to absorb at least some part of the holding time of the aircraft by saving fuel or increase the speed of the aircraft to reach the airport before congestion increases by saving flight time.

In an example, for determining the holding time in an aircraft trajectory and revised speed to fly for any subsequent trailing aircraft on same arrival/descent route into TMA:
1. Check the latitude, longitude changes at regular intervals, for example every few seconds, repetitively considering the aircraft speed to determine whether the aircraft is looping back (e.g., the latitude and longitude position with time stepping will not change significantly to match the minimum distance which can be flown for the speed).
2. Also, cross check the heading changes to determine circular/race track pattern (e.g., both from reported heading and latitude-longitude change derived heading, i.e., cross comparing to eliminate sampling/low refresh rate errors).
3. Cross check with respect to the published holding points and standard terminal arrival route (STAR) holding zones prescribed in the ATC to determine if the aircraft is in correct latitude and longitude range and allowed height range (e.g., within maximum deviation).
4. Perform a minimum distance check from the runway to eliminate separation increase maneuvers from other aircrafts or height reducing maneuvers.
5. When the results are true for a hold in the flight trajectory, count the number of loops flown and time for each loop and also time for total number of loops per holding of the aircraft.
6. Thus, a holding time for one aircraft is determined as seen by the ADS-B receiver in the ATC airspace. Determine a moving average of the holding time if there is more than one aircraft.
7. Cross check for weather (e.g., bad visibility and rain) from METAR weather report and/or any available weather information reported by aircrafts (e.g., ADS-B/AMDAR (aircraft meteorological data relay)) to check for persistence.
8. The average delay seen during a particular time/event for the aircraft on same STAR route is what needs to be compensated for the trailing aircraft to prevent wasting time and fuel, and time/speed compensation reduction may be transmitted into the flight plan modification for the trailing aircraft. This can be performed either onboard of an aircraft (e.g., using flight management system, tablet or ipad) or can be calculated and transmitted to the aircraft from a ground-based computer.
9. The average time of hold may be used to calculate a new speed for the aircraft on the same STAR route behind holding aircraft, i.e., saving fuel in descent and also saving fuel and time spent in holding pattern.

At 610, a speed of the aircraft is controlled based on the revised speed advisory by a flight management system on-board the aircraft. In one example, when ATC/other aircraft clearances permit then the target speed to fly is transferred into flight management system to fly the aircraft based on the target speed to fly. In one example, the revised speed advisory may be sent to the flight management system on-board the aircraft by determining whether the revised speed advisory can be flown taking into account real-time traffic substantially around the aircraft for safety separation and sending the revised speed advisory to the flight management system when there is no obstruction in a flight path associated with the aircraft. The speed of the aircraft may be controlled towards an end of a cruise phase and/or during a descent phase.

Figure 7:
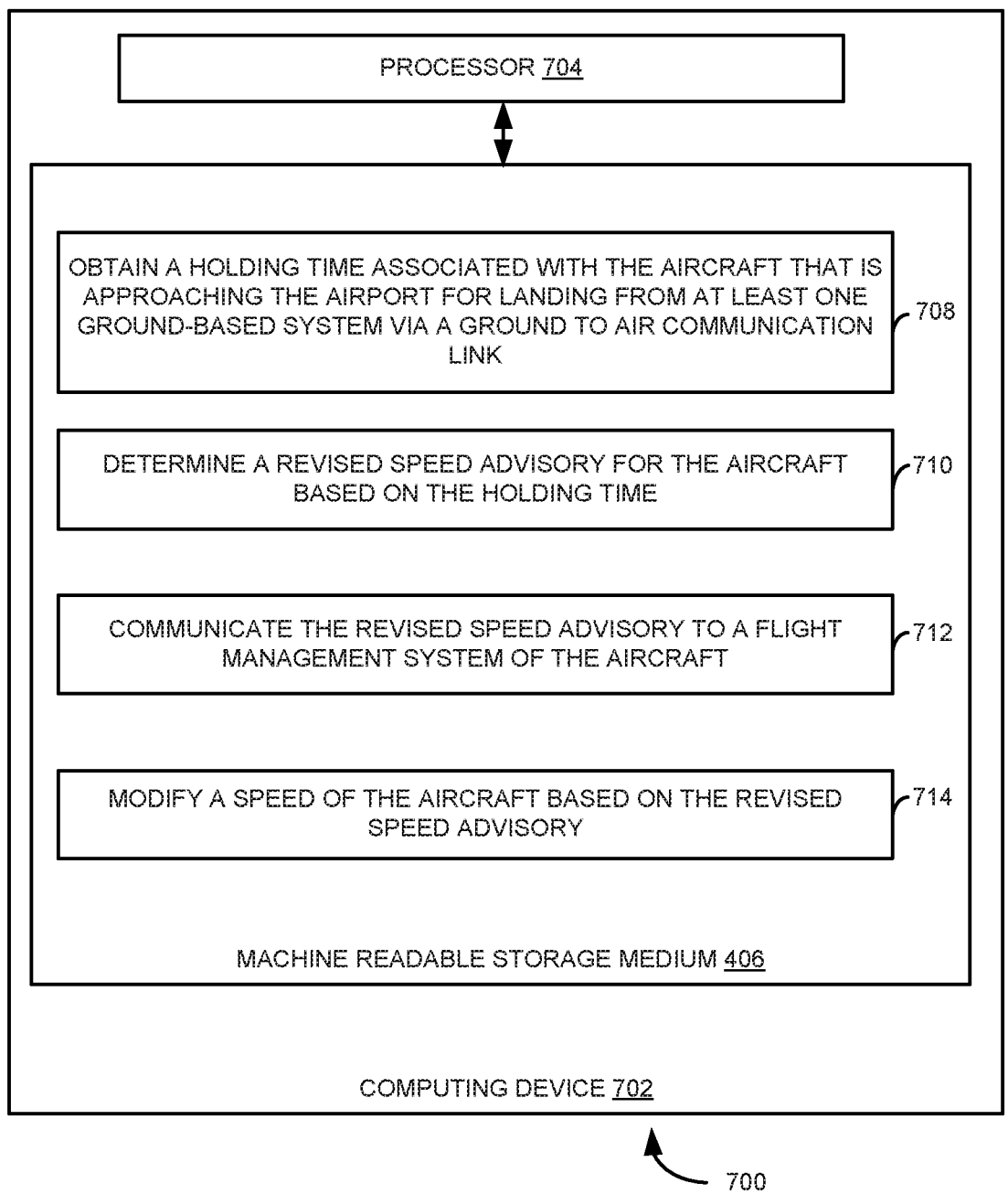
FIG. 7 depicts an example block diagram of an example computing system for determining a revised speed advisory on-board of an aircraft.

FIG. 7 is a block diagram 700 of an example computing device 702 (e.g., as part of a ground-based system or on-board aircraft computing system) for determining a revised speed advisory based on holding time. In the example of FIG. 7, a computing device 702 may include a processor 704 and a machine-readable storage medium 706. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 704 may be one or more central processing units (CPUs), microprocessors, and/or other hardware devices suitable for retrieval and execution of instructions stored in machine-readable storage medium 706. In the particular example shown in FIG. 7, processor 704 may fetch, decode, and execute instructions 708-714 to determine a revised speed advisory for an aircraft based on holding time.

As an alternative or in addition to retrieving and executing instructions, processor 704 may include one or more electronic circuits comprising a number of electronic components for performing the functionality of one or more of the instructions in machine-readable storage medium 706. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 706 may be any electronic, magnetic, optical, or other physical storage device that stores executable instructions. Thus, machine-readable storage medium 706 may be, for example, Random Access Memory (RAM), an Electrically-Erasable Programmable Read-Only Memory (EEPROM), a storage drive, an optical disc, and the like. Machine-readable storage medium 706 may be disposed within computing device 702, as shown in FIG. 7. In this situation, the executable instructions may be "installed" on the computing device 702. Alternatively, machine-readable storage medium 706 may be a portable, external or remote storage medium, for example, that allows computing device 702 to download the instructions from the portable/external/remote storage medium.

The machine-readable storage media 706 may store instructions 708-714. In an example, instructions 708-714 may be executed by processor 704 on the computing device 702 to provide a mechanism for implementation of the aircraft speed recommendation process. Instructions 708 may be executed by processor 704 to obtain a holding time associated with the aircraft that is approaching the airport for landing from at least one ground-based system via a ground to air communication link. The holding time associated with the aircraft may be computed based on traffic congestion in and around the airport, real time weather information at the airport and/or runway unavailability at the airport. The holding time may be measured based on analysis of real-time data associated with the aircrafts, the real-time weather information, and/or the runway unavailability.

Instructions 710 may be executed by processor 704 to determine a revised speed advisory for the aircraft based on the holding time. Further, instructions 712 may be executed by processor 704 to communicate the revised speed advisory to a flight management system of the aircraft. Instructions 714 may be executed by the processor 704 to modify a speed of the aircraft based on the revised speed advisory by the flight management system.

The examples described in FIGS. 1 to 7, may obtain operational savings as shown in examples below:

1. Absorbing delay by slowing down en route is preferable to any level holding.
2. Holding at higher altitude is preferable than to hold at lower altitude.
3. Slowing down the descent speed from top of descent till holding area will reduce actual hold time (when hold congestion is going to dissipate) and will give reduced penalty in both descent fuel and hold duration.
4. Slowing aircraft down en route even before descent is started may reduce the need for aircraft to: a) hold close to an airport, b) circle, c) burn extra fuel and/or d) generate more emissions.
5. Most holding areas/zones may be designated within 100 Nm of an airport and ADS-B coverage easily extend to 200-300 Nm from ground and above 300-500 Nm in air (e.g., for aircraft at altitude/cruise).
6. It is feasible to monitor the airspace around an airport using ADS- B signals/ATC radar feeds/open data.
   a. Holds can be identified and congestion level quantified.
   b. Trailing aircraft on same STAR, or en route to the STAR (e.g., arrival route) could be slowed down (e.g., via onboard system computing the time duration needed to be absorbed or if a ground system is used by CPDLC/other means of communication) or in rare cases to speed up in case congestion is likely to worsen (based on number of aircraft arrivals, local weather & and holds during a certain period).
7. Reducing inefficiencies by calculating revised speed to fly may be feasible in real-time with current technology with just minor computation capacity and monitoring around terminal areas (TMA's) using ADS-B and open big data.

It may be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method to be performed by at least one computer system onboard an aircraft, wherein the method comprises:

the at least one computer system receiving real-time data, wherein the real-time data is at least one of data providing information about aircrafts in and around an airport, and data providing information about runway unavailability at the airport;

analyzing, by the at least one computer system, the real-time data;

measuring by the at least one computer system, a holding time associated with an approach and landing of the aircraft at the airport based on the analysis of the real-time data;

determining, by the at least one computer system, a revised speed advisory for the aircraft based on the holding time; and sending the revised speed advisory to a flight navigation and performance computer and/or a flight management system on-board the aircraft, wherein a speed of the aircraft is controlled based on the revised speed advisory.

2. The method of claim 1, wherein the revised speed advisory is determined by converting the measured holding time associated with the aircraft into fuel savings or time savings along a flight path associated with the aircraft.

3. The method of claim 1, wherein the analysis of the real-time data uses pre-stored procedures and pre-stored historical data to estimate a trend in at least one of traffic congestion, and runway unavailability at the airport.

4. The method of claim 3, wherein the measuring the holding time associated with the aircraft that is approaching the airport for landing comprises dynamically measuring the holding time associated with an arrival route of the aircraft based on the trend at regular intervals.

5. The method of claim 3, wherein the pre-stored historical data comprises at least one of:
schedule, approach, and departure information of the aircrafts flying in and out of the airport, and
historical data associated with the runway unavailability.

6. The method of claim 1, wherein the sending of the revised speed advisory to the flight navigation and performance computer and/or flight management system on-board the aircraft comprises:
determining whether the revised speed advisory is flown taking into account real-time traffic substantially around the aircraft for safety separation; and
sending the revised speed advisory to the flight navigation and performance computer and/or the flight management system on-board the aircraft based on the determination.

7. The method of claim 1, wherein the obtaining of the real-time data comprises obtaining the real-time data associated with the aircrafts in and around the airport using Automatic Dependent Surveillance-Broadcast (ADS-B) transmissions from the aircrafts.

8. The method of claim 1, wherein the real-time data comprises ADS-B data comprising an altitude, speed, direction, and position of the aircrafts in and around the airport.

9. The method of claim 1, wherein the determining of the revised speed advisory comprises:
determining a reduced speed advisory to reduce the speed of the aircraft and to absorb at least some part of the holding time of the aircraft by saving fuel; or
determining an increased speed advisory to increase the speed of the aircraft to reach the airport before congestion increases, by saving flight time.

10. The method of claim 1, wherein the speed of the aircraft is controlled towards an end of a cruise phase and/or during a descent phase.

11. The method of claim 1, wherein the holding time associated with the aircraft is measured based on a holding pattern associated with each of the aircrafts that are in and around the airport and are in a same arrival route of the aircraft that is approaching the airport for landing.

12. The method of claim 1, wherein the obtaining the real-time data; analyzing the real-time data; measuring the holding time; determining a revised speed advisory and sending the revised speed advisory to the flight navigation and performance computer and/or the flight management system on-board the aircraft are performed while the aircraft is at least 20 minutes, in terms of flight time of the aircraft, before the aircraft reaches an airspace vicinity the airport.

13. The method of claim 12 wherein the airspace vicinity is airspace within 400 km of the airport.

14. An aircraft comprising:
an on-board computing system including:
a processor; and
a non-transitory memory coupled to the processor, wherein the memory comprises computer executable instructions that, when executed by the processor when the aircraft is approaching an airport for landing, cause the on-board computing system to:
calculate a holding time for the aircraft in the approach to the airport for landing, wherein the calculation of the holding time uses information received by the aircraft from at least one ground-based system via a ground to air communication link, wherein the information received from the ground to air communication link includes at least one of information about traffic congestion in and around the airport, and information about runway unavailability at the airport; and
determine a revised speed advisory for the aircraft based on the holding time; and
a flight management system communicatively coupled to the on-board computing system, wherein the flight management system is to modify a speed of the aircraft based on the revised speed advisory.

15. The aircraft of claim 14, wherein the at least one ground-based system comprises:
a historical database comprising pre-stored procedures and pre-stored historical data associated with the airport; and
a data analysis engine to:
analyze real-time data, the real-time data comprising at least one of real-time data associated with aircrafts in and around the airport, and runway unavailability using the pre-stored procedures and the pre-stored historical data to estimate a trend in at least one of traffic congestion, and runway unavailability at the airport; and
dynamically measure the holding time associated with an arrival route of the aircraft based on the trend at regular intervals.

16. The aircraft of claim 14, wherein the aircraft speed recommending engine is to:
determine whether the revised speed advisory is flown taking into account real-time traffic substantially around the aircraft for safety separation; and
send the revised speed advisory to the flight management system based on the determination.

17. The aircraft of claim 14, wherein the aircraft speed recommending engine is to measure the holding time associated with the aircraft based on a holding pattern associated with each of the aircrafts that are in and around the airport and are in a same arrival route of the aircraft that is approaching the airport for landing.

18. An aircraft comprising an on-board computing system including:
- a processor; and
- a non-transitory memory coupled to the processor, wherein the memory comprises computer executable instructions that, when executed by the processor when the aircraft is approaching an airport for landing, cause the on-board computing system to:
  - obtain real-time data, wherein the real-time data is at least one of:
    - real-time data associated with aircrafts in vicinity of the aircraft and the airport obtained using Automatic Dependent Surveillance-Broadcast (ADS-B) transmission from the aircrafts; and
    - runway unavailability at the airport obtained from the at least one ground-based system via a ground to air communication link;
  - analyze the real-time data;
  - calculate a holding time associated with the aircraft that is approaching the airport for landing based on the analysis of the real-time data; and
  - determine a revised speed advisory for the aircraft based on the holding time; and
- a flight management system communicatively coupled to the on-board computing system, wherein the flight management system is to modify a speed of the aircraft based on the revised speed advisory.

19. The aircraft of claim 18, wherein the flight management system is to modify the speed of the aircraft based on the revised speed advisory during cruise, descent and/or approach phases.

20. The aircraft of claim 18, wherein the aircraft speed recommending engine is to:
- analyze the real time data using pre-stored procedures and pre-stored historical data to estimate a trend in at least one of traffic congestion, and runway unavailability at the airport, wherein the pre-stored procedures and the pre-stored historical data are obtained from the at least one ground-based system, and wherein the pre-stored historical data comprises at least one of:
  - schedule, approach, and departure information of the aircrafts flying in and out of the airport, and
  - historical data associated with runway unavailability; and
- dynamically measure the holding time associated with an arrival route of the aircraft based on the trend at regular intervals.

21. The aircraft of claim 18, wherein the aircraft speed recommending engine is to:
- determine whether the revised speed advisory is flown taking into account real-time traffic substantially around the aircraft for safety separation; and
- send the revised speed advisory to the flight management system based on the determination.

22. The aircraft of claim 18, wherein the aircraft speed recommending engine is to measure the holding time associated with the aircraft based on a holding pattern associated with each of the aircrafts that are in and around the airport and are in a same arrival route of the aircraft that is approaching the airport for landing.

23. The aircraft of claim 18, wherein computer executable instructions, when executed by the processor when the aircraft is approaching an airport for landing, cause the on-board computing system to obtain the real-time data; analyze the real-time data; and calculate the holding time while the aircraft is at least 20 minutes, in terms of flight time of the aircraft, from an airspace vicinity of the airport.

24. The aircraft of claim 23 wherein the airspace vicinity is airspace within 400 km of the airport.

* * * * *